United States Patent [19]

Anderson

[11] Patent Number: 4,959,141
[45] Date of Patent: Sep. 25, 1990

[54] FUEL FILTER WITH POSITIVE WATER SHUTOFF

[75] Inventor: Robert D. Anderson, Tulsa, Okla.
[73] Assignee: Facet Quantek, Inc., Tulsa, Okla.
[21] Appl. No.: 393,222
[22] Filed: Aug. 14, 1989
[51] Int. Cl.⁵ ............................................. B01D 27/10
[52] U.S. Cl. .................................... 210/109; 210/430; 210/440; 210/444; 210/502.1; 210/DIG. 17; 137/549
[58] Field of Search ...................... 210/96.1, 100, 109, 210/111, 117, 416.4, 429, 430, 440, 444, 453, 457, 502.1, DIG. 17; 137/460, 456, 519.5, 549

[56] References Cited

U.S. PATENT DOCUMENTS

| | | | |
|---|---|---|---|
| 3,339,734 | 9/1967 | Kasten | 210/96.1 |
| 3,766,940 | 10/1973 | Mason | 137/460 |
| 4,364,825 | 12/1982 | Connor, Jr. | 210/416.4 |
| 4,485,011 | 11/1984 | Cole et al. | 210/96.1 |
| 4,787,949 | 11/1988 | Cole et al. | 210/504 |

*Primary Examiner*—Peter Hruskoci
*Assistant Examiner*—Matthew O. Savage
*Attorney, Agent, or Firm*—Head and Johnson

[57] ABSTRACT

A fuel filter with improved means of preventing water and particulate contaminant from passing therethrough including a cannister, a place secured to the cannister open end having a central fluid outlet and fluid inlet openings spaced from the fluid outlet, a rigid tubular fluid pervious member within the cannister having one end in sealed communication with the plate fluid outlet opening, a flexible filter medium surrounding the outer surface of the tubular member through which fuel really passes but which resists the passage of particulate matter and water, a first deformable washer having an opening therethrough secured to the end of the tubular member opposite that atached to the plate, a ball within the cannister and normally in engagement with the first washer, the ball having a diameter slightly greater than the internal diameter of the washer, and an annular seat between the plate fluid outlet opening and the first end of the tubular member, a second deformable washer member supported concentrically of and adjacent to the annular seal, the first washer being deformable to permit the ball to pass through when a predetermined fluid pressure drop develops across the flexible filter media, the ball thereby engaging and passing the second washer to engage the seat to block further fluid flow through the filter, the second washer serving to retain the ball adjacent the seat even in absence of fluid pressure.

7 Claims, 3 Drawing Sheets

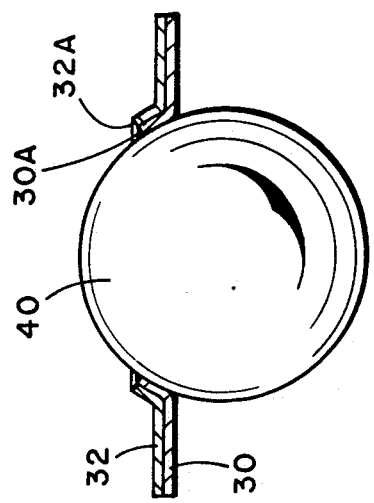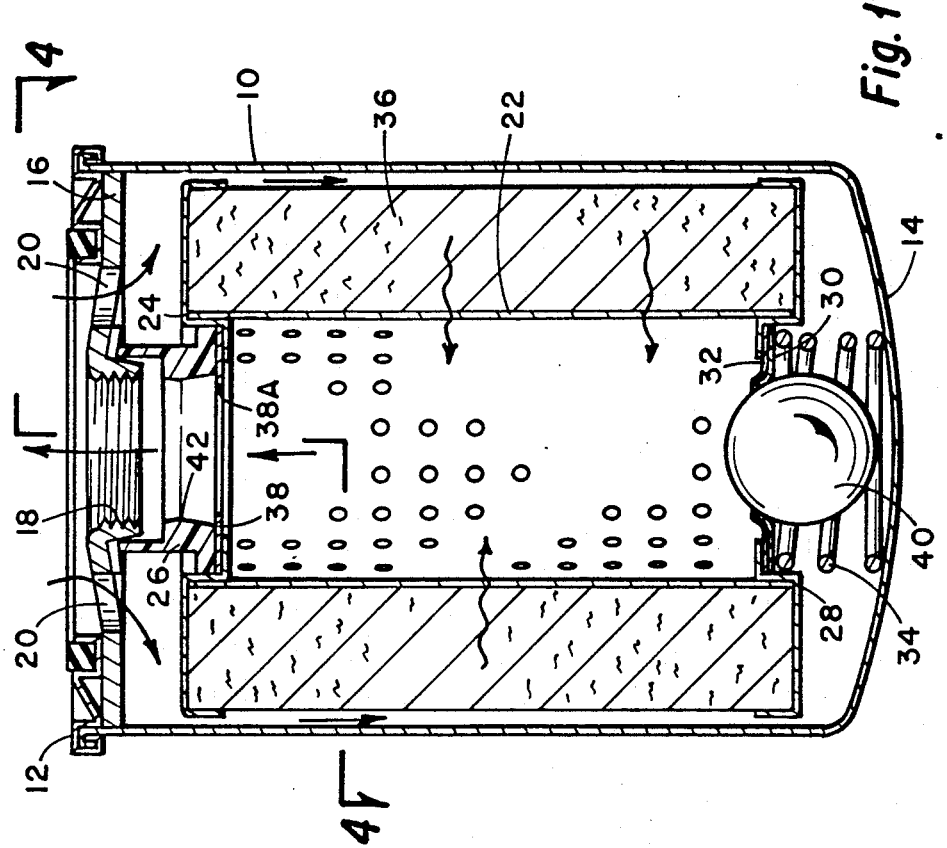

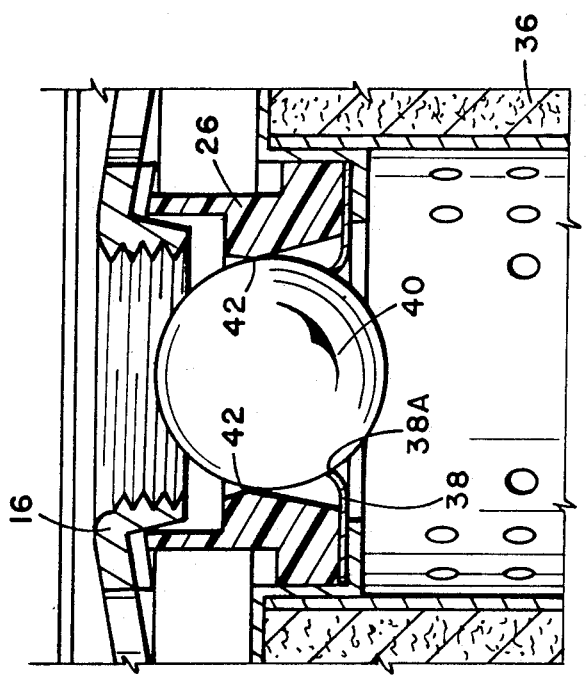
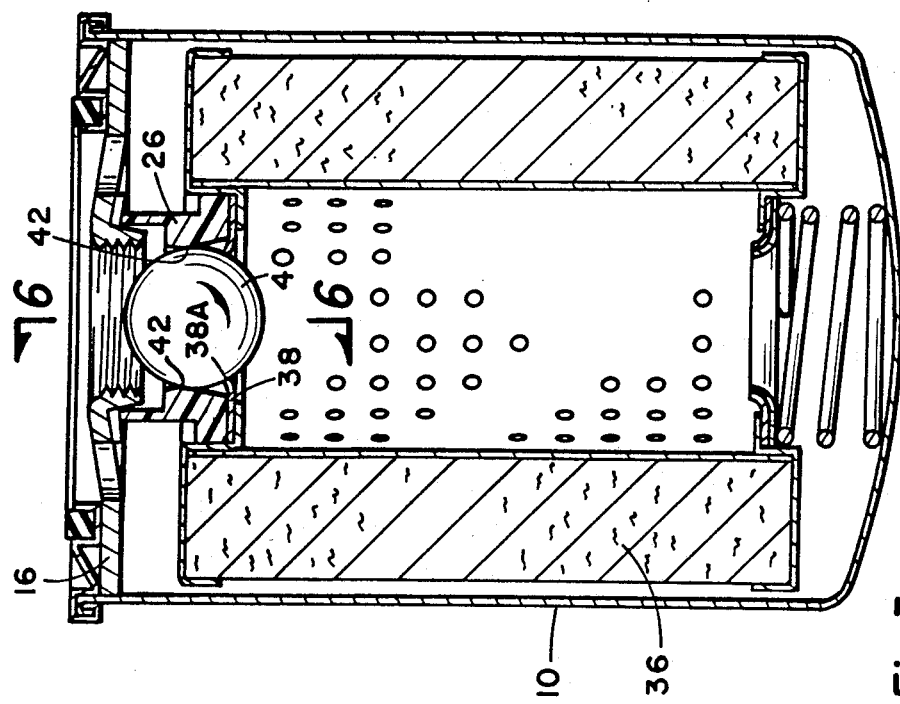

FUEL FILTER WITH POSITIVE WATER SHUTOFF

SUMMARY OF THE INVENTION

Fuel, such as gasoline, diesel fuel and the like is seriously impaired if water becomes admixed with it. That is, most uses of fuel such as gasoline, diesel fuel and so forth, such as in internal combustion engines, are very seriously affected by the presence of water in the fuel. First, of course, water is not combustible, and, therefore, subtracts from the energy value available from a given quantity of fuel. Second, water freezes easily and can block fuel lines in cold environments. Third, water tends to carry with it contaminants and more readily reacts with metals to form rust. For these and other reasons, it is very important that in order to preserve high fuel quality, that water be prevented from traveling in a fuel flow system.

A known expedient to intercept water in a fuel system is to provide a filter media of the type which permits fuel, such as gasoline, diesel fuel or the like to pass therethrough, but which resists the passage of water. Filters of this type include hydrophilic materials which absorb and expand in the presence of water, but which are not olefinic, that is, which do not absorb hydrocarbons. This type of filter media is useful in blocking the flow of water since the absorption and expansion can serve to close the filter media against the passage of fluid therethrough.

The use of a water absorbent filter media alone as a means of preventing the passage of water in a fuel flow system, however, is not sufficiently dependable. Instead, it is highly desirable that in a fuel flow filtering system a positive shut-off be provided so that when sufficient water is detected in a fuel flow system, such as by water absorbent fuel media swelling or otherwise reacting to resist the further fluid flow therethrough, a positive, mechanical type shut-off be obtained. U.S. Pat. No. 4,485,011 to Cole et al discloses a type of shut-off valve in conjunction with a fuel filter arrangement. In the device of the Cole et al patent a ball is maintained in position when the pressure drop across a filter media is below a certain level, but is displaced when the pressure drop increases, such as occurs when the filter media absorbs water. The ball is then passed to a valve closure position to stop further fluid flow through the filter.

The basic concept of Cole et al U.S. Pat. No. 4,485,011 is good and useful and is a significant advancement in the state of the art. However, in the arrangement of the Cole et al U.S. Pat. No. 4,485,011 the ball, after being moved by pressure differential to a closed position is free to migrate away from such closed position when fluid flow through the filter is stopped, that is, when a pressure differential no longer exists. When fluid flow again is permitted, a given volume of fluid flow may be required to again move the ball back to the closed position and such quantity of fluid flow may be sufficient to permit a quantity of water to pass through the filter and into the fuel flow stream.

The present disclosure is directed towards an improvement in the basic concept of Cole et al U.S. Pat. No. 4,485,011. More particularly, this disclosure provides a structure for controlling the position of a shut-off ball within a fuel filter. Therefore, this disclosure provides a fuel filter having improved means of preventing water and particulate contaminant from passing therethrough.

The filter includes a cannister having a closed and an opened end. A plate is secured to the open end. The plate has a threaded central fluid outlet opening therein and fluid inlet openings which are spaced circumferentially about the outlet opening. A rigid tubular fluid impervious member, formed of stiff material such as aluminum, plastic or the like is positioned within the cannister. The tubular member first end is affixed in sealed relationship with the plate so as to provide closed communication with the fluid outlet opening in the plate.

A flexible filter media is secured circumferentially around the outer tubular surface of the rigid tubular member. Fuel flows into the cannister through the fuel inlet openings. The fuel flows through the filter media and into the pervious rigid tubular member and out the top of the tubular member through the plate fluid outlet opening. The filter media serves to entrap particulate matter, and, in addition, the filter media used in the filter of this disclosure has the characteristics of entrapping water to thereby resist the flow of water through the filter. Further, the filter media is such that as water is entrapped further flow of all fluids through the filter media is resisted. It can be seen that as water is trapped, the pressure drop required to force fluid through the filter media increases at a rate directly proportional to the quantity of water intercepted by the filter media.

A first washer having an opening therethrough is concentrically affixed to the end of the tubular member opposite the end connected with the plate fluid outlet. Positioned below this washer member, that is, in a direction opposite the fluid outlet, is a ball, preferably formed of a plastic material. The ball is held in close proximity or in normal engagement with the washer so as to prevent fluid flow from the interior of the cannister through the washer to the interior of the tubular member. The washer is of thin deformable material, preferably aluminum.

An annular seat member is supported in the cannister in closed communication with the plate fluid outlet opening and in communication with the end of the tubular member at the fluid outlet opening. Below the annular seat, that is, in the direction away from the fluid outlet opening, a second washer is provided. The second washer, like the first, has a large diameter opening therethrough, the diameter being less than the external diameter of the ball. The second washer is also deformable and is designed to be deformed to permit the ball to pass through upon the existence of sufficient pressure differential across the ball.

When hydrocarbon fuel, such as gasoline or diesel fuel, flows through the filter, the fuel freely passes through the filter media which intercepts any particulate matter. Pressure drop does not significantly increase as long as the fluid flowing through is substantially all hydrocarbon fuel. However, when water is commingled with the fluid, the water is entrapped or absorbed by the filter media which responds to restrict further fluid flow through the fluid media. As more water is absorbed, the pressure differential necessary for further fluid to pass therethrough increases. When this pressure differential develops above a preselected level, the pressure differential across the ball forces it to deform and pass through the first washer member. The ball then enters into the interior of the rigid tubular member and flows to the opposite end thereof where it encounters the second washer member. The ball, by the effect of pressure differential thereacross, deforms and passes through the second washer member and then engages the annular seat. This results in blockage of all further flow through the filter.

A significant improvement of the present invention is the relationship between the second washer and the annular seat. The deflection of the second washer to permit the ball passing therethrough serves to retain the ball in position substantially contiguous with the annular seat. Thus, once the ball has passed through the first and second washer members, it is held in close communication with the annular seat and additional fluid flow through the filter is blocked.

A better and fuller understanding of the disclosure will be had with reference to the following description and claims, taken in conjunction with the attached drawings.

DESCRIPTION OF THE DRAWINGS

FIG. 1 is a cross-sectional view of a filter for use in a fluid delivery system wherein fuel flows through the filter for removal of solid contaminant and water. FIG. 1 shows a filter in the normal fluid flow arrangement wherein hydrocarbon fuel freely passes through the filter media.

FIG. 3 shows a filter of this disclosure in cross-section as in FIGS. 1 and 2, but showing the ball in seated engagement with the seat, the ball being retained in such position by the deformed second washer member.

FIG. 5 is an enlarged view of the ball and first washer members showing how the ball is held in position wherein a predetermined pressure differential will cause the ball to deform the washer members and pass into the interior of the rigid tubular pervious member.

FIG. 6 is a partial cross-sectional view taken along the lines 6—6 of FIG. 3 showing the ball in closed position against the annular seat and restrained in such position by the deflected second washer member.

DESCRIPTION OF THE PREFERRED EMBODIMENT

Figure 4:
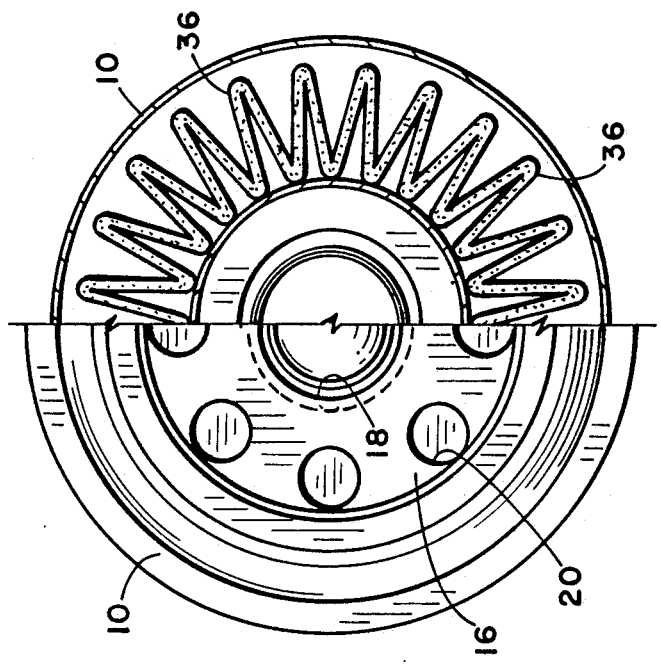
FIG. 4 is a top view shown partially cut away of the filters of FIGS. 1, 2 and 3, to show additional features of the filter.

Referring to the drawings and first to FIG. 1, a filter which employs the principle of this disclosure is illustrated. The filter includes a cannister 10 having an upper open end 12 and a closed bottom end 14. Closing the upper end 12 is a plate 16 which has a central threaded fluid outlet opening 18. Concentrically surrounding the fluid outlet opening 18 and spaced from it are a plurality of fluid inlet openings 20.

Positioned within the cannister is a rigid tubular fluid pervious member 22 which may be formed of stiff material, such as aluminum or other metal. The rigid tubular member 22 is fluid pervious, that is it has a plurality of small diameter openings therein as illustrated. The upper end 24 is in sealed engagement with fluid outlet opening 18 in plate 16. This sealed engagement is accomplished by means of an annular seal member 26.

The lower end 28 receives a first washer member formed of a plurality of washers 30 and 32. These washer members, best seen in the enlarged fragmentary view of FIG. 5, each include a large opening therethrough indicated by the numerals 30A and 32A, respectively.

A compression spring 34 urges washers 30 and 32 and the rigid tubular member 22 in a direction towards plate 16.

Surrounding the external circumferential surface of the tubular rigid member 22 is filter media 36. This filter media may be in the form of a plate of relatively thin filter media pleated as shown in FIG. 4 or it may consist of several circumferential wraps of filter media. The filter media 36 is of the type which freely permits the flow of hydrocarbon fuel therethrough, but which intercepts solid particulate matter and water. The method of interception of water varies with different kinds of filter media. One type of water absorbing filter media is illustrated and described in detail in U.S. Pat. No. 4,787,949. This type of filter media includes material which reacts with water to swell and makes the filter media substantially impervious to additional fluid flow therethrough.

Positioned adjacent the tubular upper member 24 and adjacent the seal member 26 is a second washer member 38. This second washer member, like the first washer members 30 and 32 described, is of deformable material, such as relatively thin aluminum or other material having similar characteristics. The second washer member 38 has an opening 38A which is of a selected internal diameter.

Positioned in the filter exteriorly of the tubular rigid member 22 and below the first and second washer members 30 and 32 is a ball or sphere 40. The ball 40 is preferably made of a plastic material. The external diameter of ball 40 is greater than the normal internal diameter of openings 30A and 32A in washers 30 and 32 and of opening 38A and washer 38.

As fluid flows into the filter through inlet openings 20, (the flow is indicated by the arrows) it flows to the exterior surface of the filter media 38. Hydrocarbon fuel, such as gasoline, diesel fuel or the like, freely passes therethrough and into the interior of the tubular rigid member 22. This fuel flow then passes out of the filter through the outlet opening 18 and end plate 16. The filter media 36 intercepts any solid matter so that a clean fuel is obtained through the outlet 18. The pressure of the fuel flow within the cannister 10 is applied against the ball 40 which moves it into sealed contact with washers 30 and 32 as shown in FIGS. 1 and 5. As long as fuel is freely flowing to the filter media 36, the ball 40 is in the position as shown in FIG. 1.

Figure 2:
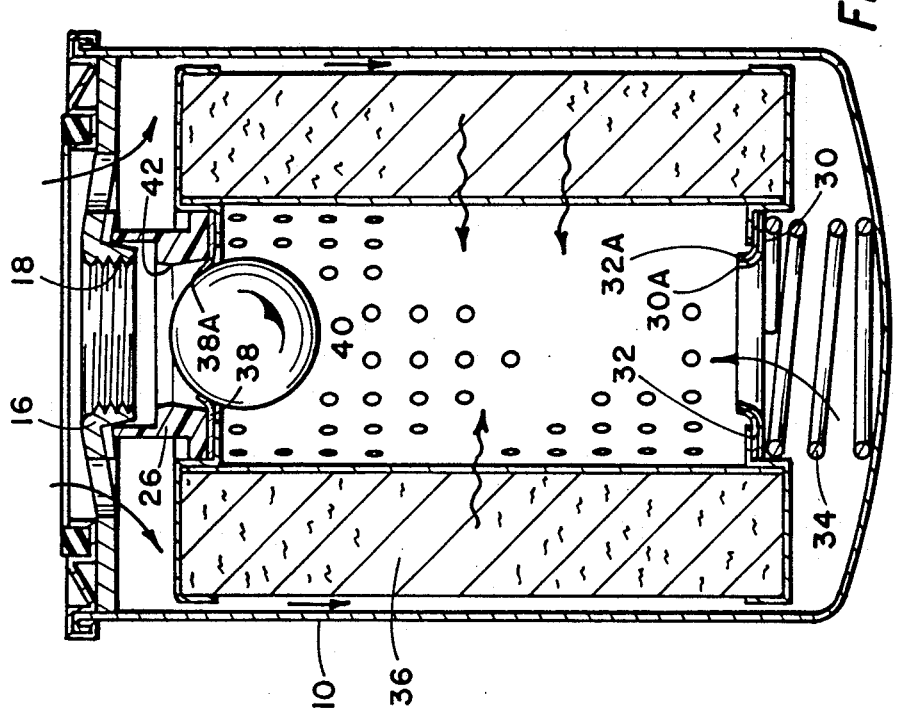
FIG. 2 is an external view of the fuel filter as in FIG. 1 but showing the status of the filter in an intermediate stage wherein the filter media has intercepted water to the extent that a significant pressure differential has developed across the filter media causing the shut-off ball to enter into the central tubular member and to position itself against a second washer member within the filter.

However, if water occurs in the fuel stream flow and enters cannister 10, it is intercepted by the filter media 38. When sufficient water is intercepted by the filter media, resistance to the flow of fluid therethrough increases and the fluid pressure differential across the filter media increases. This pressure differential is applied across ball 40. When sufficient differential pressure occurs, ball 40 deforms washers 30 and 32 allowing the ball to pass therethrough. The ball is moved by fluid flow towards the fluid outlet 18 until it intercepts washer 38 as shown in FIG. 2. With sufficient pressure differential, the ball 40 deforms washer 38 allowing the ball to move past it and to engagement with the annular seat 42 formed on the interior surface of seal member 26. The ball thus closes further fluid flow through the filter.

After the ball passes and deforms washer 38, it is not free to return to the interior of tubular rigid member 22 since it is held in place by the deformed washer member 30A. Thus, if fluid flow stops so that no pressure differential exists, nevertheless, ball 40 is held in close proximity, if not in direct contact, with seat 42. Thereafter, if fluid flow is again attempted through the filter, the ball immediately seals against seat 42 to prevent fluid flow.

This improvement is contrasted with U.S. Pat. No. 4,485,011 previously mentioned, and prevents inadvertent small quantities of contaminated fuel to be passed through the filter.

The preselected pressure differential across the filter which will cause ball 40 to deflect washers 30 and 32 can be predetermined in several ways. The thicknesses of the washers, the diameter of the openings 30A and 32A, the diameter of ball 40 and the rigidity of the materials of which the washers are made affect the required differential pressure necessary to force the ball through the washers. In addition, once these features have been selected, the required fluid pressure can be more finally selected by predeforming washers 30 and 32. This is accomplished during assembly as shown in FIG. 5 by physically forcing the ball 40 partially through washer 30 and 32.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A fuel filter having improved means of preventing water and particulate contaminant from passing therethrough comprising:
    a cannister having a closed and an opened end;
    a plate secured to the cannister open end and having a central fuel outlet opening therein and at least one fuel inlet opening spaced from said outlet opening;
    a rigid tubular fuel pervious member within said cannister having an upper and lower end, the upper tubular end being in sealed communication with said central fuel outlet opening;
    flexible filter media surrounding the outer tubular surface of said rigid tubular fluid pervious member through which fuel freely passes but which resists the passage of particulate matter and water;
    a first washer member having an opening therethrough secured concentrically to the tubular member lower end, the first washer member being of thin deformable material;
    a ball within said cannister and normally in engagement with said first washer member as fuel flows through the filter, the ball having a diameter greater than the internal diameter of said first washer member and thereby serving to close the lower end of said tubular member;
    an annular seat member having closed communication between said central fuel outlet opening and the interior of said tubular member at said upper end, the annular seat being closed to fuel flow when engaged by said ball;
    a second washer member supported concentrically adjacent to and spaced from said annular seat member, the second washer member being of thin deformable material and having an opening therethrough normally of diameter slightly less than the diameter of said ball, said second washer member being deformable to permit said ball to pass when a predetermined fuel pressure drop develops across said flexible filter media to thereby engage said annular seat member to block further fuel flow through the filter, the second washer member serving to thereafter retain said ball adjacent said annular seat member even in the absence of fuel pressure.

2. A fuel filter according to claim 1 wherein said first washer member is predeformed to a configuration which permits said ball to pass therethrough upon a predetermined differential fluid pressure thereacross.

3. A fuel filter according to claim 1 wherein said first washer member is formed of thin metal.

4. A fuel filter according to claim 3 wherein said first washer member is formed of aluminum.

5. A fuel filter according to claim 1 wherein said first washer member is formed of a plurality of thin deformable washers.

6. A fuel filter according to claim 2 wherein said first washer member is formed of a plurality of thin deformable washers all of which are predeformed to configurations which permit said ball to pass therethrough upon a predetermined differential fuel pressure thereacross.

7. A fuel filter according to claim 1 wherein said flexible filter media is formed at least in part by material which becomes substantially impervious to the passage of fuel therethrough when wetted with water.

* * * * *